United States Patent Office 2,751,382
Patented June 19, 1956

2,751,382

NEW CHEMO-THERAPEUTICALLY ACTIVE SALTS

Henry Martin, Zurich, and Ernst Habicht, Schaffhausen, Switzerland, assignors to Cilag Limited, Schaffhausen, Switzerland, a company of Switzerland No Drawing. Application July 2, 1954,
Serial No. 441,174

Claims priority, application Germany July 6, 1953

5 Claims. (Cl. 260—239.65)

This invention relates to new chemo-therapeutically active salts of the formula

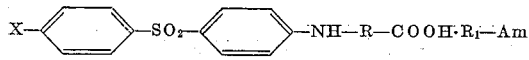

in which X represents an amino group or a halogen atom, R represents a lower bivalent hydrocarbon radical, for example an alkylene radical, which may also contain an alkyl, aralkyl, aryl or cycloalkyl radical, $R_1$ represents hydrogen, an alkyl, aralkyl or alkanol radical, Am represents a monoalkylamino, monoaralkylamino, a monoalkanolamino, a dialkanolamino or a morpholino group.

Valuable therapeutics of the general formula

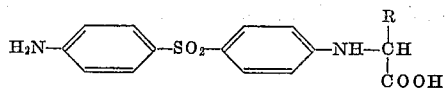

in which R represents a hydrogen atom, an alkyl or aryl residue, have been described in our Austrian Patent No. 162,304.

The alkali or alkaline earth metal salts of the above acids mentioned therein unfortunately have the disadvantage that their aqueous solutions react alkaline with a consequent severe limitation in the possibilities of their chemo-therapeutic use.

The production of the two acids N-[p-(p-aminophenylsulphonyl)-phenyl]-glycine and N-[p-(p-aminophenylsulphonyl)]-phenyl-β-alanine has been described by E. L. Jackson (J. Am. Chem. Soc. 70, p. 680 (February 1948)) who purified them via their pyridine salts.

Since these pyridine salts were produced by the use of a large excess of pyridine and had to be purified by recrystallisation from pyridine, it is easy to appreciate that this method of purification is hardly technically practicable, all the more because on subsequent dissociation into the acids the adherent smell of pyridine is practically impossible to remove.

Moreover the pyridine salts cannot be used for therapeutic purposes because of the high toxicity of pyridine.

It has now been found that practically neutrally reacting non-poisonous and readily water-soluble salts of acids of the general formula

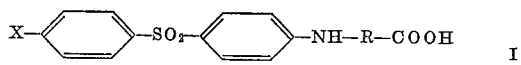

in which X represents an amino group or a halogen atom and R represents a lower bivalent hydrocarbon radical for example an alkylene radical, which may also contain an alkyl, aralkyl, aryl and cycloalkyl radical, are obtained when the acids are reacted in manner known per se, with an organic base of the formula

in which $R_1$ represents hydrogen, an alkyl, aralkyl or alkanol radical, Am represents an alkylamino, aralkylamino, alkanolamino, dialkanolamino or a morpholino group.

These salts almost without exception crystallise well and can readily be purified. They are, therefore, very suitable for the production in pure form of the corresponding acids, which have hitherto been very difficult to prepare in pure form by recrystallisation. The salts thus obtained can be isolated and if desired purified by recrystallisation, or the solutions which have been obtained by reacting the two components can be used directly.

Since the salts in question also have a low toxicity and can form highly concentrated and practically neutral aqueous solutions, they are very suitable for parenteral administration.

Thanks to their neutral reaction and because they do not cause irritation they can also be used for treating infections of the eye and mucous membranes.

Many of these salts besides have a very good antimycotic action, especially salts of sulphones wherein X signifies the halogen atom.

There may be mentioned as bases which can be used for the salt formation: Mono-, di- and triethanolamine, mono-, di- and tripropanolamine, ethylaminoethanol and ethylaminopropanol, benzylaminoethanol, dibenzylaminoethanol and dibenzylaminopropanol, methyl-, ethyl- and benzyl-morpholine, morpholinoethanol, morpholinopropanol, morpholine etc.

There may be mentioned as acids which can be used for the salt formation: 4-amino-, 4-fluoro-, 4-chloro-, 4-bromo-, 4-iodo-, 4'-carboxymethyl-, 4'-α-carboxyethyl-, 4'-β-carboxyethyl-, 4'-α-carboxypropyl-, 4'-β-carboxypropyl-, 4'-γ-carboxypropyl-, 4'-carboxybutyl-, 4'-α-carboxybenzylamino-diphenylsulphones.

Example 1

34 g. of p. p'-diaminodiphenylsulphone-N-acetic acid and 12, 1 g. of diethanolamine are dissolved in 200 cc. of absolute hot ethanol, boiled for a short time with charcoal and filtered hot. After cooling for a considerable time the precipitated salt is separated by suctional filtration. The salt is recrystallised once from 400 cc. of absolute ethanol and a little charcoal to give 21 (i. e. 46% of the theoretical) of the pure white diethanolamine salt of p. p'-diaminodiphenylsulphone-N-acetic acid.

The salt thus produced gives an aqueous solution which is colourless even in thick layers. It dissolves very readily in water, readily in methanol, less readily in ethanol and sparingly or not at all in the other conventional organic solvents.

Even in the analytically pure condition the salt does not show a sharp melting point; the melting point lies between 80–100° C. depending upon the rate of heating.

In the same manner as described one obtains: From 4 - amino-4' - carboxypropylaminodiphenylsulphone and monoethanolamine the monoethanolamine salt which melts under decomposition at 100–120°; the benzylaminoethanol salt of 4-amino-4'-carboxyethylaminodiphenylsulphone which decomposes between 100 and 150°.

Example 2

30 g. of p. p'-diaminodiphenylsulphone-N-acetic acid and 9 g. of morpholine are reacted together in 150 cc. of absolute ethanol in the manner described in Example 1. The morpholine salt is obtained in glittering colourless needles which dissolve readily in cold water to give a solution of almost neutral reaction. The salt thus obtained melts at 133–135° C. with decomposition.

In the same manner one obtains: The morpholine salt of 4-amino-4'-carboxyethylaminodiphenylsulphone; the ethylaminoethanol salt of 4-amino - 4' - α-carboxybenzylaminodiphenylsulphone; the benzylaminoethanol salt of 4-amino-4'-α - carboxypropylaminodiphenylsulphone; the morpholine salt of 4-amino-4' - β - carboxyethylaminodiphenylsulphone.

Example 3

32, 5 g. of 4-chloro-4-amino-diphenylsulphone-N-acetic acid are suspended in 1000 cc. of pure ethanol and reacted with 9 g. of morpholine. The liquid is boiled for a short time, filtered with the aid of a little charcoal and the filtrate is allowed to cool. 20–25 g. of the morpholine salt, melting at 189–191° C. are obtained. These can be recrystallised from ethanol.

The diethylamine salt which melts at 147–148° C. is obtained in the same manner.

The diethanolamine salt of the 4-chloro-4'-carboxymethylaminodiphenylsulphone melts not sharp and under decomposition between 120–150°.

In the same manner one obtains: The morpholine salt of 4-bromo-4'-carboxymethylaminodiphenylsulphone; the morpholine salt of 4-iodo-4'-carboxymethylaminodiphenylsulphone; the morpholine salt of 4-chloro-4'-carboxyethylaminodiphenylsulphone; the butylaminoethanol salt of 4-fluoro-4'-carboxymethylaminodiphenylsulphone; the diethanolamine salt of 4-chloro-4'-carboxymethylaminodiphenylsulphone; the diethanolamine salt of 4-bromo-4'-carboxymethylaminodiphenylsulphone.

What we claim is:

1. New chemo-therapeutically active salts of the formula

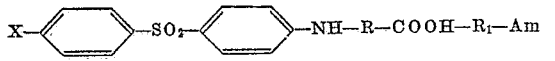

wherein X is a member of the class selected from the amino group and a halogen atom, R is a lower alkylene radical, R₁ is a substituent selected from the class consisting of a hydrogen atom, a lower alkyl, and a lower alkanol radical, Am is a group selected from the class consisting of a mono lower alkyl amino group, a mono lower alkanol amino group, a di-lower alkanol amino group, and a morpholino group.

2. The new chemo-therapeutically active salt of the formula

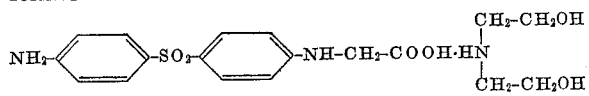

3. The new chemo-therapeutically active salt of the formula

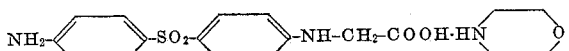

4. The new chemo-therapeutically active salt of the formula

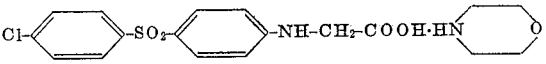

5. The new chemo-therapeutically active salt of the formula

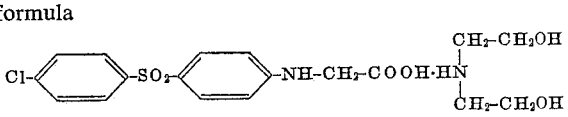

References Cited in the file of this patent

UNITED STATES PATENTS

| | | |
|---|---|---|
| 2,589,211 | Rawlins | Mar. 18, 1952 |

FOREIGN PATENTS

| | | |
|---|---|---|
| 162,304 | Austria | Feb. 25, 1949 |
| 254,803 | Switzerland | Jan. 3, 1949 |